United States Patent
Yamamoto et al.

(10) Patent No.: US 9,823,529 B2
(45) Date of Patent: Nov. 21, 2017

(54) LIQUID CRYSTAL PANEL

(71) Applicant: Sakai Display Products Corporation, Sakai-shi, Osaka (JP)

(72) Inventors: Akihiro Yamamoto, Sakai (JP); Takuya Ohishi, Sakai (JP)

(73) Assignee: Sakai Display Products Corporation, Sakai-shi, Osaka (JP)

(*) Notice: Subject to any disclaimer, the term of this patent is extended or adjusted under 35 U.S.C. 154(b) by 0 days.

(21) Appl. No.: 15/100,206

(22) PCT Filed: Nov. 29, 2013

(86) PCT No.: PCT/JP2013/082156
§ 371 (c)(1),
(2) Date: May 27, 2016

(87) PCT Pub. No.: WO2015/079555
PCT Pub. Date: Jun. 4, 2015

(65) Prior Publication Data
US 2017/0031220 A1 Feb. 2, 2017

(51) Int. Cl.
*G02F 1/1362* (2006.01)
*G02F 1/1343* (2006.01)

(52) U.S. Cl.
CPC .. *G02F 1/136213* (2013.01); *G02F 1/136286* (2013.01); *G02F 2001/134345* (2013.01)

(58) Field of Classification Search
CPC ........ G02F 1/136213; G02F 1/136286; G02F 2001/134345; G09G 2300/0426
See application file for complete search history.

(56) References Cited

U.S. PATENT DOCUMENTS

| | | | | |
|---|---|---|---|---|
| 2011/0285612 A1* | 11/2011 | Yamashita | ........ | G02F 1/136213 345/88 |
| 2012/0057091 A1* | 3/2012 | Kawabata | ........... | G02F 1/13439 349/38 |
| 2013/0321730 A1* | 12/2013 | Huang | .................. | G09G 3/006 349/41 |
| 2015/0044789 A1* | 2/2015 | Yamada | ................ | G02F 1/1309 438/18 |

FOREIGN PATENT DOCUMENTS

| WO | WO2010087049 A1 | 8/2010 |
|---|---|---|
| WO | WO2010134439 A1 | 11/2010 |
| WO | WO2012157725 A1 | 11/2012 |

* cited by examiner

*Primary Examiner* — Jia Pan
(74) *Attorney, Agent, or Firm* — Bret E. Field; Bozicevic, Field & Francis LLP (57) ABSTRACT

Provided are a liquid crystal panel and a display apparatus using a liquid crystal panel preventing uneven luminance while contributing a slimmed border of the display apparatus.

4 Claims, 9 Drawing Sheets

| DIVISION NUMBER | NUMBER OF WIRING | SIGNAL ARRIVAL RATE |
|---|---|---|
| NOT DIVIDED | 12 | 99.9% |
| DIVIDED INTO 2 | 6 | 99.9% |
| DIVIDED INTO 3 | 4 | 99.8% |
| DIVIDED INTO 6 | 2 | 99.2% |

LIQUID CRYSTAL PANEL

This application is the national phase under 35 U.S.C. 371 of PCT International Application No. PCT/JP2013/082156 which has an International filing date of Nov. 29, 2013 and designated the United States of America.

BACKGROUND OF THE INVENTION

1. Field of the Invention

The present invention relates to a wiring structure in a driving circuit of a liquid crystal panel having a plurality of pixels disposed in a lattice shape therein. In particular, the present invention relates to a liquid crystal panel capable of efficiently achieving a prevention of display unevenness, while coping with a request of slimmed border in a display apparatus using the liquid crystal panel.

2. Description of Related Art

A display apparatus using a liquid crystal panel displays an image by allowing contrast to differ for each different position in the liquid crystal panel. Representation of the contrast is achieved by adjusting a transmission amount of light from a light source installed behind the liquid crystal panel at each position. Adjusting of the transmission amount of light is achieved by operating an alignment direction of liquid crystal molecules in a liquid crystal layer for each different position in the liquid crystal panel which holds the liquid crystal layer between polarizing substrates whose polarization directions are perpendicular to each other. A color image is represented by a set of points having different colors and contrasts. The liquid crystal panel achieves a display of the color image by making a position corresponding to each point as a pixel, and adjusting the color and contrast (luminance) of red (R), green (G), and blue (B) for each pixel. In particular, a matrix type liquid crystal panel has a pixel region in which a plurality of pixels are arranged in a lattice shape. The liquid crystal panel achieves the display of the color image by adjusting the transmission amount of light from the light source for color, for each pixel of the pixel region.

One pixel in the matrix type liquid crystal panel includes a plurality of sub-pixels. The one pixel is formed by the sub-pixels of each of RGB colors. The one pixel may have a configuration including two sub-pixels for each color. In this case, the one pixel includes six sub-pixels. In the configuration in which the one pixel includes two sub-pixels for each color, even when a pixel defect occurs in one sub-pixel of two sub-pixels, it is possible to prevent the entire pixel from becoming the defected pixel by complementing the defect with the other pixel, and maintain a ratio of normal pixels at a high level. In addition, by allowing the transmission amount of light in two sub-pixels to differ from each other, it is possible to finely adjust intermediate gradation of the color or luminance of each pixel.

The operation of the alignment direction of liquid crystal molecules in the liquid crystal layer is performed by adjusting an electric field strength applied between electrodes facing each other with the liquid crystal layer interposed therebetween. In the matrix type liquid crystal panel, the electrodes are respectively formed at locations corresponding to the sub-pixels on two glass substrates, briefly, so as to be formed in a lattice shape, a liquid crystal material containing the liquid crystal molecules is sealed between the two glass substrates disposed to face a surface on a side in which the electrodes are formed, and the alignment direction of the liquid crystal molecules corresponding to each sub-pixel is operated by controlling a voltage applied to each electrode. Further, each electrode is made of a highly translucent conductive material. Furthermore, an alignment film for aligning the liquid crystal molecules is formed on a circuit including the electrodes on each glass substrate.

In addition, the glass substrate has wirings formed thereon of the conductive material to control the voltage applied to the electrodes of each sub-pixel. In the glass substrate, conductor wires are formed in a row direction and a column direction depending on the numbers of the sub-pixels in the row direction and the column direction, the electrodes of each sub-pixel are connected to the wirings in the row direction and the column direction one by one, respectively. The voltage applied to the electrodes of each sub-pixel is controlled by applying a control signal to the electrodes of each column for each one row.

Further, in an active matrix type liquid crystal panel, the electrodes of each sub-pixel are connected with a thin film transistor (TFT), and are provided with an auxiliary capacitor (added condenser). Thereby, it is possible to maintain a control voltage in each sub-pixel during transferring the control signal for applying a signal to the electrodes of each column, and improve display quality. In addition, by allowing the control voltage to the auxiliary capacitors of two sub-pixels to differ from each other, it is possible to provide a difference in a voltage applied to the respective sub-pixels, and finely adjust the intermediate gradation of each pixel.

Therefore, the wirings to each electrode, and wirings for a signal to apply the control voltage of each auxiliary capacitor are formed on the glass substrate. In the wirings for the auxiliary capacitors, a plurality of wirings arranged in the row direction are connected to stem wirings wired in the column direction on both sides outside the pixel region, the stem wirings are connected to a control unit for the auxiliary capacitor, and the control signal of a rectangular wave is output from the control unit.

The number of pixels in a recent liquid crystal panel is, for example in a case of full high-definition, 1920 in the row direction and 1080 in the column direction. When one pixel is formed by six sub-pixels including two sub-pixels for colors of RGB, the number of sub-pixels becomes 1920×1080×6, which is ten million or more. Accordingly, the wirings of the auxiliary capacitor of each sub-pixel becomes a vast number and distance. Thereby, a transfer rate of the control signal to each row is decreased, and it may be observed as display unevenness.

A decrease in the transfer rate of the control signal can be prevented by increasing a thickness of the stem wiring. However, in the display apparatus using the recent liquid crystal panel, increasing of size and thinning, as well as slimmed border are required. Increasing of the thickness of the stem wiring causes greater difficulty in slimmed border.

Therefore, in a conventional display apparatus, by providing a branch line in the wirings to the auxiliary capacitors, a rounding of the control signal of a rectangular wave is restrained, and further for grouping the control voltage to the respective auxiliary capacitors into a plurality of types, a transfer speed of the control signal is improved.

SUMMARY OF THE INVENTION

By the wiring to the auxiliary capacitors disclosed in Patent Document 1, the rounding of the control signal to the auxiliary capacitors can be suppressed. However, in order to achieve further slimmed border, and prevent wave rounding, there is a problem entailed in routing of the wirings for the auxiliary capacitors.

In consideration of the above-mentioned circumstances, it is an object of the present invention to provide a liquid crystal panel having a configuration that can reduce a wiring area with respect to an auxiliary capacitor in electrodes of each sub-pixel, and suppress wave rounding of a rectangular wave of a signal, thereby efficiently achieving a prevention of display unevenness, while coping with a request of slimmed border in a display apparatus using the liquid crystal panel.

A liquid crystal panel according to one embodiment of the present invention, comprising: a substrate on which a plurality of pixels, electrodes and auxiliary capacitors of the electrodes are arranged, in a matrix, at a pixel region in a non-peripheral part, a set of one of the plurality of electrodes and one of the plurality of auxiliary capacitors being formed, so as to associate to each of the plurality of pixels; a plurality of auxiliary capacitor wirings connected to the plurality of auxiliary capacitors associated to the plurality of pixels in each row, and being classified into groups so as to belong to the same group in every plurality of rows; a signal transmission unit transmitting a signal to the plurality of auxiliary capacitors through the plurality of auxiliary capacitor wirings; a plurality of branch wirings arranged in a column direction, being respectively connected to the plurality of auxiliary capacitor wirings of the same group on points within the pixel region; a stem wiring supplying a signal to the plurality of branch wirings, consisting of unit wirings arranged to be separated from each other, in a row direction on a peripheral part of the substrate, and the unit wirings being respectively connected to a plurality of branch wirings belonging to the same group; and a transmission unit dividing the signal from the signal transmission unit for the groups and transmitting divided signals to the unit wirings respectively.

In the liquid crystal panel according to the embodiment of the present invention, the unit wirings may be juxtaposed in the column direction, and the number of unit wirings in the column direction may be smaller than the number of the groups.

In the liquid crystal panel according to the embodiment of the present invention, the plurality of auxiliary capacitor wirings of each group may be connected with a plurality of unit wirings at an equal interval in the row direction among the unit wirings, through a plurality of branch wirings which are respectively connected to the plurality of unit wirings.

A liquid crystal panel according to one embodiment of the present invention, comprising: a substrate on which a plurality of pixels, electrodes and auxiliary capacitors of the electrodes are arranged, in a matrix, at a pixel region in a non-peripheral part, a set of one of the plurality of electrodes and one of the plurality of auxiliary capacitors being formed, so as to associate to each of the plurality of pixels; a plurality of auxiliary capacitor wirings connected to the plurality of auxiliary capacitors associated to the plurality of pixels in each row, and being classified into groups so as to belong to the same group in every plurality of rows; a signal transmission unit transmitting a signal to the plurality of auxiliary capacitors through the plurality of auxiliary capacitor wirings; a plurality of branch wirings arranged in a column direction, being respectively connected to the plurality of auxiliary capacitor wirings of the same group on points within the pixel region; a stem wiring supplying a signal to the plurality of auxiliary capacitor wirings, consisting of unit wirings arranged to be separated from each other, in a column direction on a peripheral part of the substrate, and the unit wirings being respectively connected to a plurality of auxiliary capacitor wirings belonging to the same group; and a transmission unit dividing the signal from the signal transmission unit for the groups and transmitting divided signals to the unit wirings respectively.

In the liquid crystal panel according to the embodiment of the present invention, the unit wirings may be juxtaposed in the row direction, and the number of unit wirings in the row direction may be smaller than the number of the groups.

In the liquid crystal panel according to the embodiment of the present invention, the branch wirings of each group may be wired at an equal interval in the row direction, and may be connected with a plurality of unit wirings at an equal interval in the column direction among the unit wirings, through a plurality of auxiliary capacitor wirings which are respectively connected to the plurality of unit wirings.

In the liquid crystal panel according to the embodiment of the present invention, each of the plurality of pixels respectively may include a plurality of sub-pixels for different colors or different light intensities, and the respective set of one of the plurality of electrodes and one of the plurality of auxiliary capacitors may associate to each of the plurality of sub-pixels.

According to the embodiment of the present invention, the auxiliary capacitor wirings connected to the auxiliary capacitors of the electrodes associating to the pixels in each row are classified into the groups in every plurality of rows, and the auxiliary capacitor wirings are connected with the branch wirings in the column direction for the groups at a plurality of locations. The branch wirings in the column direction are connected to the stem wirings which are wired in the row direction outside the pixel region for each group. The stem wirings arranged outside the pixel region are configured to be separated into a plurality of wirings, and are connected to the branch wirings of the same group for each separated unit wiring, such that, even on the same straight line, different unit wirings may be connected with the column wirings of the different groups. The different unit wirings on the same straight line may be used as the stem wirings of the groups, such that, it is possible to reduce a wiring area in the outside the pixel region in the column direction.

Further, the stem wirings may be wired outside the pixel region in the column direction. In this case, the stem wirings are connected to the branch wirings in the column direction through the auxiliary capacitor wirings for each group, and are further connected to other auxiliary capacitor wirings of the same group from the branch wirings. Also in this case, the stem wirings are configured to be separated into a plurality of wirings, and are connected to the respective separated unit wirings for the groups, such that, even on the same straight line, different unit wirings may be connected to the auxiliary capacitor wirings of the different groups. In this regards, the stem wirings in the row direction are not required, and the different unit wirings on the same straight line may be used as the stem wirings of the groups, such that it is possible to further reduce the wiring area outside the pixel region in the column direction.

According to the embodiment of the present invention, According to the present invention, the plurality of unit wirings are arranged in the column direction (or the row direction), but the number of the arranged unit wirings are smaller than the number of the groups. In the case where the branch wirings are connected to the stem wirings wired for the groups without being separated in the row direction, the number of the rows of the stem wirings is the number of the groups. However, by forming the stem wirings by the unit wirings arranged in the column direction (or the row direction) with the number smaller than the number of the groups, it is possible to reduce the wiring area in the outside the pixel region in the column direction.

According to the embodiment of the present invention, the plurality of unit wirings of the same group are configured to be located at an equal interval. The plurality of branch wirings respectively connected to the unit wirings which are located at an equal interval are connected to the auxiliary capacitor wirings at a plurality of points in the row direction. Therefore, it is possible to equally transfer the signal in the row direction to the auxiliary capacitor wirings of each group.

In addition, when wiring the stem wirings in the column direction, the unit wirings located at an equal interval are connected to the branch wirings which are equally located through the auxiliary capacitor wirings, and each branch wiring is connected to other auxiliary capacitor wirings at a plurality of points in the row direction. Also in this case, it is possible to equally transfer the signal in the row direction to the auxiliary capacitor wirings of each group.

According to the embodiment of the present invention, one pixel includes the plurality of sub-pixels for different colors or different light intensities, and the sub-pixels are arranged in a matrix state as a lattice shape within the same pixel. Each electrode and the auxiliary capacitor respectively associate to one sub-pixel. The auxiliary capacitor wirings connected to the auxiliary capacitors of each sub-pixel receive the signal through the stem wiring including the separated unit wirings. By the configuration in which one pixel corresponds to the plurality of sub-pixels for different colors or different light intensities, it is possible to finely express the color and gradation by the one pixel. Although the number of the auxiliary capacitors are increased, by the configuration of the stem wiring including the separated unit wirings, reducing the wiring area and maintaining a transfer rate of the signal to the auxiliary capacitor may be achieved.

According to the embodiment of the present invention, the wiring area in the outside the pixel region in the column direction can be reduced, thus it is possible to cope with the request of slimmed border. Further, according to the embodiment of the present invention, the signal to the auxiliary capacitor can be transferred to the auxiliary capacitor wirings disposed in the row direction by connecting, to the unit wirings, the plurality of branch wirings connected at the plurality of locations, thus it is possible to prevent the rounding of the signal of a rectangular wave, and achieve a prevention of display unevenness.

DESCRIPTION OF THE PREFERRED EMBODIMENTS

Hereinafter, embodiments of the present invention will be described in detail with reference to the accompanying drawings.

Embodiment 1

Figure 1:
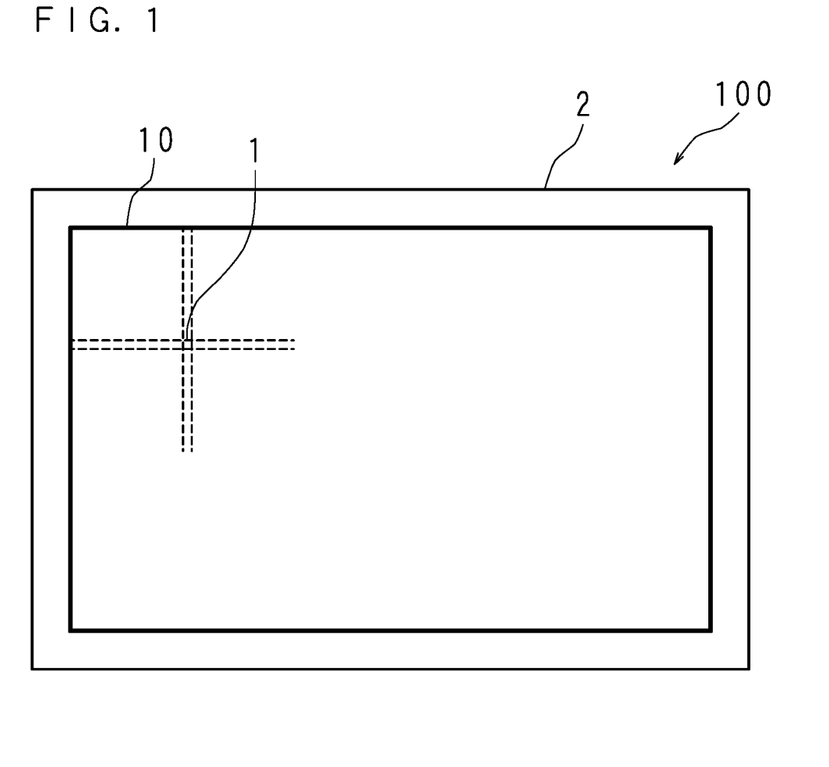
FIG. 1 is a front view schematically illustrating a liquid crystal panel according to Embodiment 1.

FIG. 1 is a front view schematically illustrating a liquid crystal panel 100 according to Embodiment 1. The liquid crystal panel 100 is a display panel, and is formed in a rectangular plate shape.

The liquid crystal panel 100 employs an active matrix type. The liquid crystal panel 100 has a pixel region 10 in which a plurality of pixels 1 are arranged in a matrix state as a lattice shape. For example, in the pixel region 10, 1920 pixels 1 and 1080 pixels 1 are aligned in a row direction and a column direction, respectively. Further, the pixels 1 according to Embodiment 1 includes six sub-pixels 11 as described below.

The liquid crystal panel 100 is constituted as described below. Color filters 21 are formed on a substrate 2 on a front side of the liquid crystal panel 100, of a pair of transparent rectangular substrates (glass substrates). The substrate 2 includes a transparent insulation film formed on the color filters 21, and further includes electrodes 22 formed thereon. An alignment film is formed on the electrodes 22. One substrate includes each element including electrodes 31 for driving a liquid crystal formed thereon of a highly translucent conductive material, and an alignment film is formed on the electrodes 31. A seal material for sealing spacers and the liquid crystal is formed outside the pixel region 10 on any one alignment film side of the substrates. The substrates are bonded to each other so as to face the alignment film side. A liquid crystal material containing liquid crystal molecules is injected into a space formed by the spacers between the substrates, and sealed therebetween. Further, the substrates includes polarizing filters attached on outer surfaces on sides opposite to the facing surfaces, respectively. Furthermore, the substrates are connected with driving circuits connected to the elements including the electrodes 22 and 31 thereon.

Figure 2:
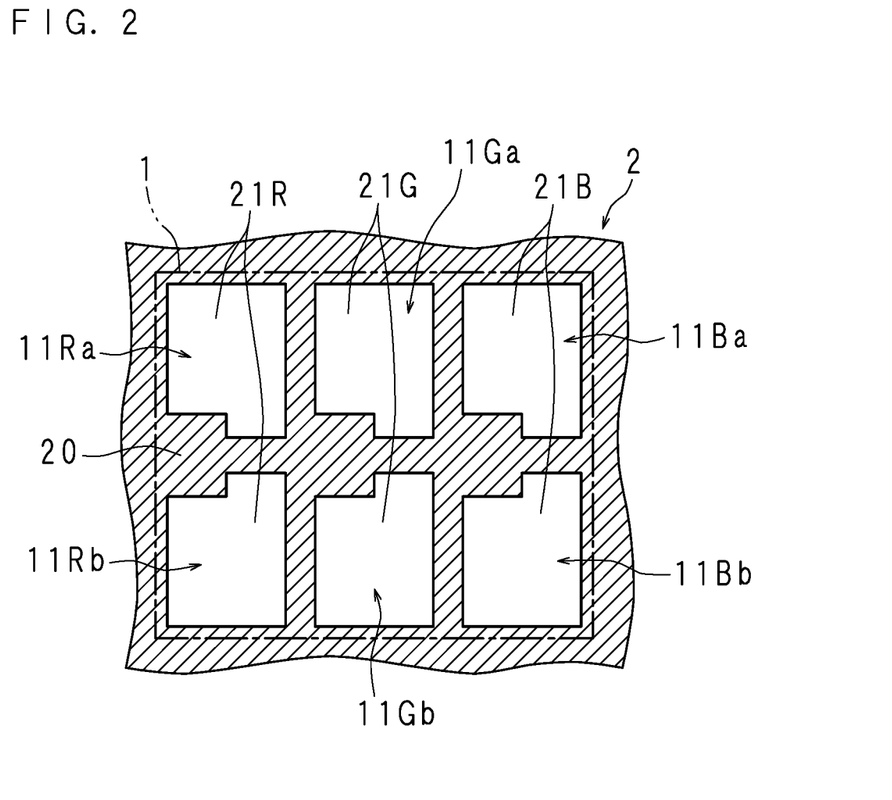
FIG. 2 is an explanatory view illustrating a configuration of a sub-pixel.

FIG. 2 is an explanatory view illustrating a configuration of a sub-pixel. FIG. 2 is an enlarged view of a portion corresponding to the pixels 1 in the substrate 2 of FIG. 1 from the polarizing filter side (a front side). Further, the polarizing filters and the substrate 2 are not illustrated in FIG. 2.

The pixel 1 includes six sub-pixels 11Ra, 11Rb, 11Ga, 11Gb, 11Ba and 11Bb. The six sub-pixels 11Ra, 11Rb, 11Ga, 11Gb, 11Ba and 11Bb respectively include two sub-pixels for color of red (R) sub-pixels 11Ra and 11Rb, green (G) sub-pixels 11Ga and 11Gb, and blue (B) sub-pixels 11Ra and 11Rb.

As illustrated in FIG. 2, the color filter 21 of the substrate 2 includes filters 21R, 21G and 21B, and a black matrix 20. The red filter 21R, green filter 21G, and blue filter 21B are strip-shaped filters having a length in a lateral direction of the pixel region 10 and a width for the sub-pixel 11, respectively. The filters 21R, 21G and 21B are cyclically arranged in an order of RGBRGB and . . . in a longitudinal direction along the lateral direction of substrate 2. The black matrix 20 is, for example, a resin film containing carbon black, and is formed so as to have substantially rectangular opening portions at locations corresponding to each of the sub-pixels 11, so that light does not transmit through a gap between the sub-pixels 11. Thereby, the light transmits through the red filter 21R at the locations corresponding to the sub-pixels 11Ra and 11Rb, transmits through the green filter 21G at the locations corresponding to the sub-pixels 11Ga and 11Gb, and transmits through the blue filter 21B at the locations corresponding to the sub-pixels 11Ba and 11Bb, so that it is possible to be viewed from a front side.

Figure 4:
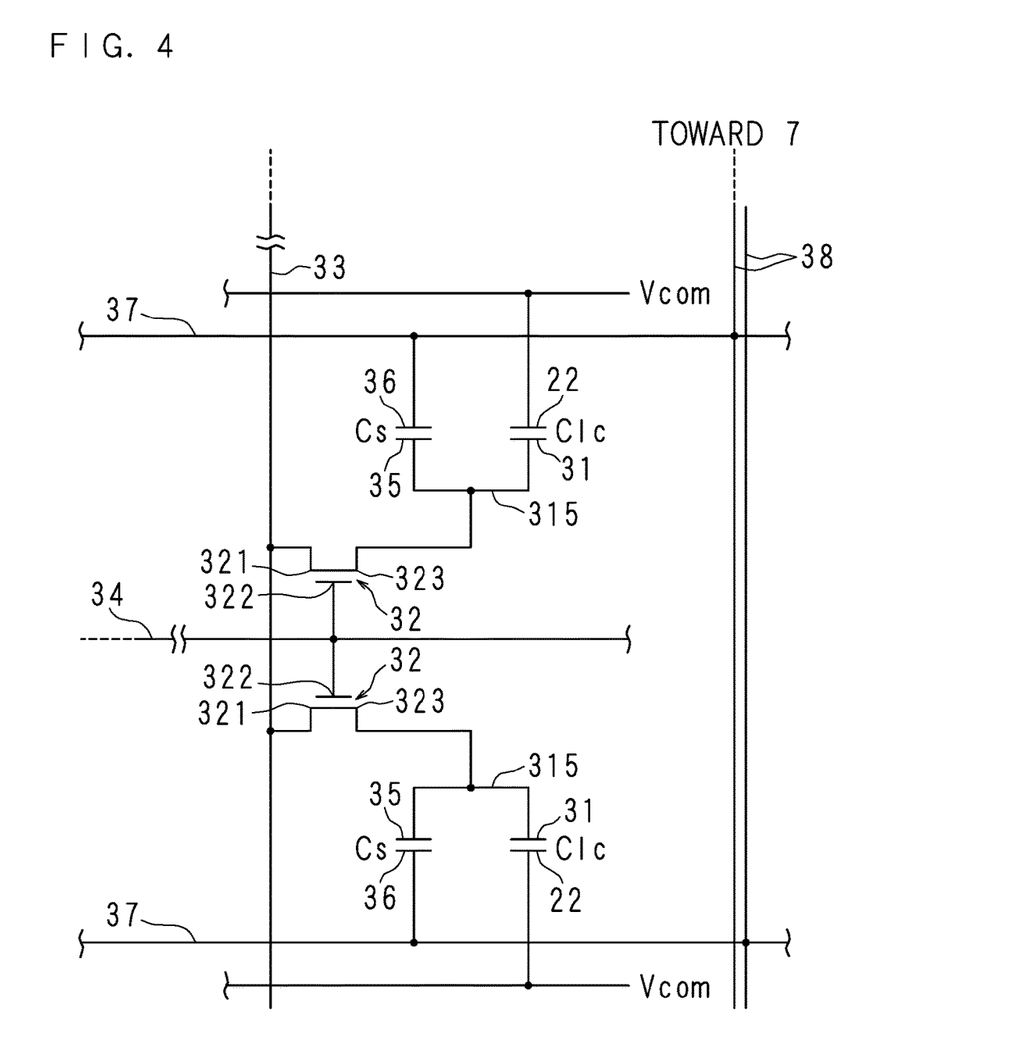
FIG. 4 is a view illustrating a circuit configuration of the element including the electrodes formed on the substrate.

The substrate 2 includes counter electrodes 22 formed on the color filter 21 thereof, and the counter electrodes 22 are connected to a common voltage Vcom, respectively (see a circuit diagram of FIG. 4).

Figure 3:
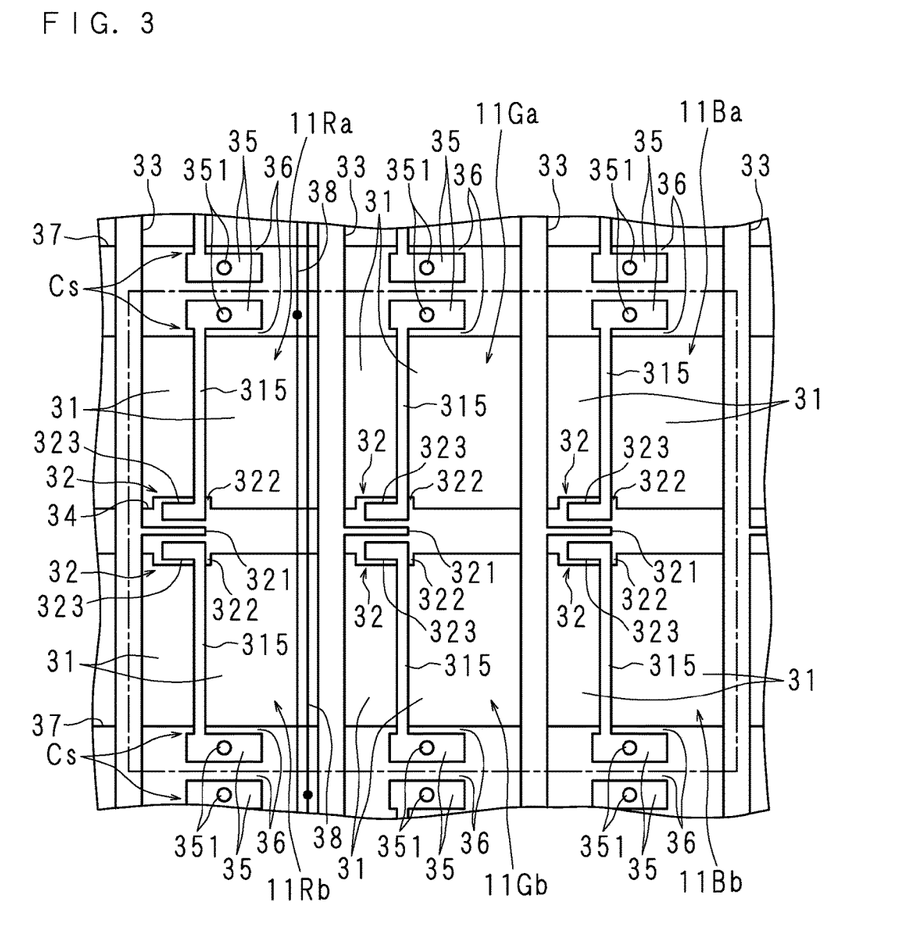
FIG. 3 is an explanatory view schematically illustrating an element including electrodes formed on a substrate.

FIG. 3 is an explanatory view schematically illustrating the element including the electrodes 31 formed on the substrate 3, and FIG. 4 is a view illustrating a circuit configuration of the element including the electrodes 31 formed on the substrate 3. FIG. 3 shows a state in which a portion corresponding to the pixel 1 is viewed from the alignment film side (front side) in an enlarged form. Further, the alignment film is not illustrated therein.

As illustrated in FIG. 3, the substrate 3 includes pixel electrodes 31 formed thereon so as to associate to each sub-pixel 11. The pixel electrode 31 is made of a transparent conductive material. For example, indium tin oxide (ITO) is used. Further, the substrate 3 includes thin film transistors (TFTs) 32 and auxiliary capacitors Cs respectively formed in each pixel electrode 31, as well as source bus lines 33, gate bus lines 34, auxiliary capacitor bus lines 37, and branch wirings 38 formed thereon to supply a signal to the respective thin film transistors 32 and the auxiliary capacitors Cs.

The thin film transistors 32 are formed near a center between two sub-pixels 11Ra and 11Rb (11Ga and 11Gb, and 11Ba and 11Bb) of each color. The thin film transistor 32 has a source electrode 321, a gate electrode 322 and a drain electrode 323.

The auxiliary capacitors Cs are formed near an upper or a lower outside of two sub-pixels 11Ra and 11Rb (11Ga and 11Gb, and 11Ba and 11Bb) of each color. Further, the auxiliary capacitors Cs are formed between auxiliary capacitor electrodes 35 and 36 which face each other through the insulation film.

The gate bus lines 34 are wired in the row direction between the respective pixel electrodes 31 so as to pass through the center of the respective pixels 1 in the row direction. Further, the gate bus lines 34 are configured to be opened one by one row between the respective pixel electrodes 31. The gate bus lines 34 are formed on an upper or a lower edge part of the pixel electrodes 31 through an insulation layer. The gate electrode 322 of the thin film transistor 32 is formed so as to protrude in the column direction from the gate bus line 34. The gate bus lines 34 are connected to a gate driver (not illustrated) outside the substrate 3.

The source bus lines 33 are wired in the column direction between the respective pixel electrodes 31. The source bus lines 33 are formed under a portion of the pixel electrodes 31, and on a portion of the gate bus lines 34 through the insulation layer. The source electrodes 321 of the thin film transistors 32 are formed so as to protrude to the row direction from the location corresponding to a gap between the respective pixel electrodes 31 of the source bus lines 33. The source bus lines 33 are connected to a source driver (not illustrated) outside the substrate 3.

The auxiliary capacitor bus lines 37 are wired in the row direction by opening one by one row on the gap of the row direction between the respective pixel electrodes 31, so as to alternate with the gate bus lines 34. The auxiliary capacitor bus lines 37 are formed on the upper or lower edge part of the pixel electrodes 31 through the insulation layer.

The branch wirings 38 are wired in the column direction on any one of the pixel electrodes 31 in the respective pixels 1. The branch wirings 38 are made of a metal material in the same layer as the source bus lines 33, and are connected to the auxiliary capacitor bus lines 37 in every plurality of rows through contact holes. The branch wirings 38 connect the auxiliary capacitor bus lines 37 and a stem wiring 70 as described below.

The drain electrodes 323 of the thin film transistors 32 are formed on the gate bus lines 34 through the insulation layer along the row direction, so as to face the source electrodes 321 protruding from the source bus lines 33.

The auxiliary capacitor electrodes 35 are formed on the auxiliary capacitor bus lines 37 through the insulation layer. The auxiliary capacitor electrodes 35 are electrically connected with the pixel electrodes 31 through contact holes 351 which penetrate the insulation layer. The auxiliary capacitor electrode 36 is a portion facing the auxiliary capacitor electrode 35 on the auxiliary capacitor bus lines 37.

The drain electrodes 323 are connected with the auxiliary capacitor electrodes 35 by lead-out wirings 315 which are disposed so as to cross on the pixel electrodes 31 in the column direction. In addition, the drain electrodes 323 are connected to the pixel electrodes 31 which are electrically connected with the auxiliary capacitor electrode 35 through the contact holes 351.

By the pixel electrodes 31, the thin film transistors 32 and the auxiliary capacitors Cs constituted as described above, at a timing when the thin film transistors 32 of each row are turned on one by one row through the gate bus lines 34, a control signal to the pixel electrodes 31 of each row supplied through the source bus lines 33 is input by the pixel electrodes 31, and information of the control signal is held by the auxiliary capacitors Cs. Thereby, by adjusting a transmission amount of light in the liquid crystal layer corresponding to the sub-pixels 11Ra, 11Rb, 11Ga, 11Gb, 11Ba and 11Bb of each color, an image display that finely expresses the color or gradation of luminance of each pixel 1 is achieved.

In this case, according to Embodiment 1, in the sub-pixels 11Ra and 11Rb (11Ga and 11Gb, and 11Ba and 11Bb) of each color, the control signal having the reversed direction of signal voltage change and the same variation is transmitted to the auxiliary capacitor electrodes 36 of the respective auxiliary capacitors Cs, so that the sub-pixels 11Ra and 11Rb (11Ga and 11Gb, and 11Ba and 11Bb) of each color have different luminance levels. Thereby, it is possible to richly express an intermediate gradation by finely adjusting the luminance of each pixel, and improve viewing angle characteristics.

The control signal to the auxiliary capacitor electrodes 36 of the respective auxiliary capacitors Cs is output for each row from an auxiliary capacitor control unit 7 which is electrically connected to the substrate 3, and the control signal is transferred through the auxiliary capacitor bus lines 37. A rectangular wave is used in the control signal. Since the control signal should be transferred to a plurality of auxiliary capacitors Cs, there is a problem of occurring a phenomenon referred to as wave rounding.

Therefore, in order to reliably transfer the control signal from the auxiliary capacitor control unit 7 at a high speed, the liquid crystal panel 1 according to Embodiment 1 has a configuration including the stem wiring 70 formed by separated unit wirings 71 to 74 in the row direction.

Figure 5:
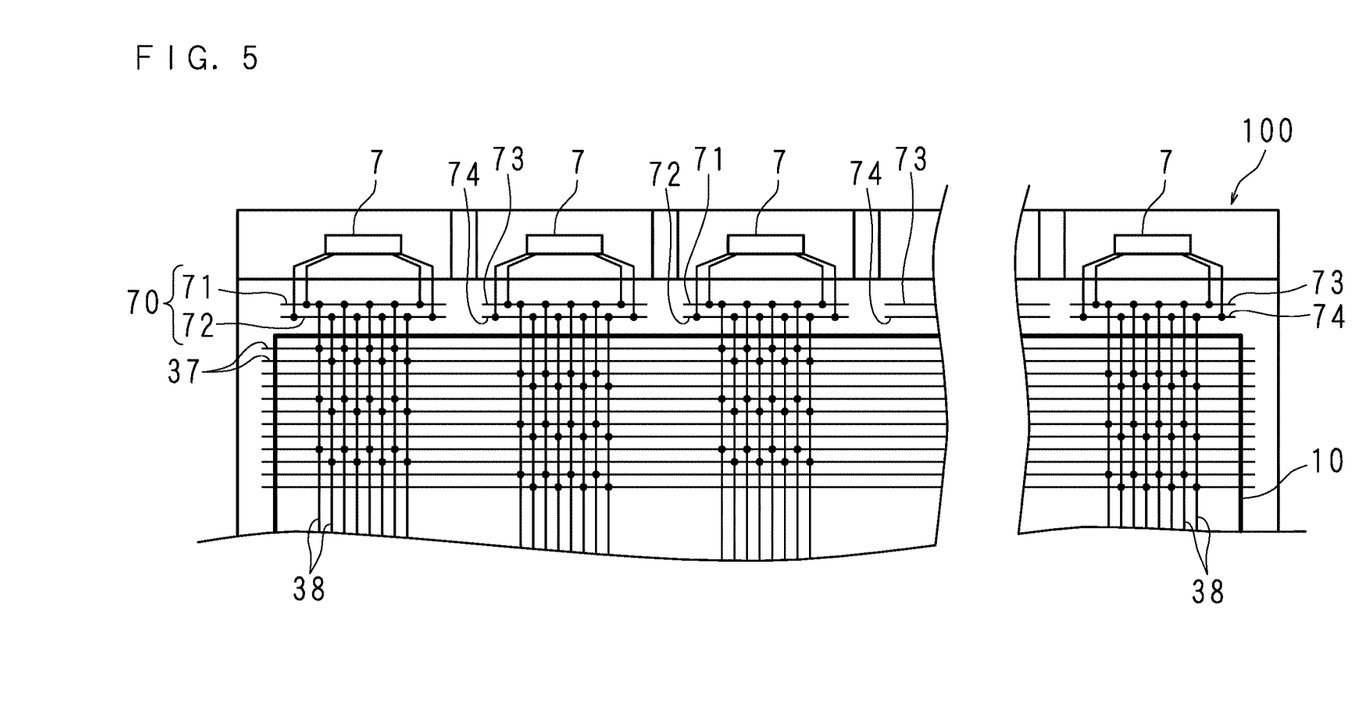
FIG. 5 is an explanatory view schematically illustrating an arrangement of a stem wiring according to Embodiment 1.

Hereinafter, the stem wiring 70 according to Embodiment 1 will be described in detail with reference to the accompanying drawings. FIG. 5 is an explanatory view schematically illustrating an arrangement of the stem wiring 70 according to Embodiment 1.

The stem wiring 70 is disposed at an upper peripheral part outside the pixel region 10 along the row direction, so that two wirings thereof are separated into the same number. The separated wirings are referred to as the unit wirings 71 to 74, respectively. In other words, two wirings and even number wirings of the unit wirings 71 to 74 along the row direction are arranged in the column direction and row direction, respectively, to form the stem wiring 70. Further, the number of the unit wirings 71 to 74 arranged in the row direction is configured to correspond to the number of the auxiliary capacitor control units 7 described below.

In response to outputting the control signal by the source driver in block units obtained by dividing into a plurality of pixel regions 10 in the column direction, the auxiliary capacitor control unit 7 is similarly divided into block units. The auxiliary capacitor control units 7 of each block are connected with two unit wirings 71 and 72 (or 73 and 74) arranged up and down among the unit wirings 71 to 74, and outputs, to the unit wirings 71 and 72 (or 73 and 74) connected thereto, the control signal to the respective auxiliary capacitors Cs, respectively.

The branch wirings 38 are wired in the column direction over inside and outside the pixel region 10. In addition, the branch wirings 38 are connected to any one of the unit wirings 71 to 74. The adjacent branch wirings 38 are configured to be connected to different unit wirings 71 to 74.

Furthermore, a connection relationship between the stem wiring 70, the branch wirings 38 and the auxiliary capacitor bus lines 37 are configured in such a way that these wirings are classified into four groups, and the control signals for the groups are transferred from the auxiliary capacitor control unit 7. Hereinafter, the connection relationship therebetween will be described in detail.

A plurality of auxiliary capacitor bus lines 37 are classified so as to be the same group in every four rows. In each group unit, the auxiliary capacitor bus lines 37 of the same group are configured to be connected to a plurality of branch wirings 38 in the same group. The branch wirings 38 are configured to be connected to the respective unit wirings 71 to 74 at each four thereof, and the four branch wirings 38 belong to the same group.

Specifically, the auxiliary capacitor bus lines 37 are cyclically classified into four groups of groups I, II, III, IV, I and . . . from the top. The branch wirings 38 are cyclically classified into each group of groups I, II, I, II, I, II, I, II, III, IV, III, IV, III, IV, I, II and . . . in this order from a left. The branch wirings 38 are configured to be wired in one block for each two groups (groups I and II, and groups III and IV), and are configured in such a way that the adjacent branch wirings 38 within one block belong to different groups. And, for each group I to IV, the auxiliary capacitor bus lines 37 and the branch wirings 38, which belong to the same group, are connected to each other.

The unit wirings 71 to 74 constituting the stem wiring 70 are classified into the unit wiring 71 belonging to the group I, the unit wiring 72 belonging to the group II, the unit wiring 73 belonging to the group III, and the unit wiring 74 belonging to the group IV. The unit wiring 71 belonging to the group I and the unit wiring 72 belonging to the group II are configured to be wired in one block side by side in the column direction up and down. Similarly, the unit wiring 73 belonging to the group III and the unit wiring 74 belonging to the group IV are configured to be wired in another block side by side in the column direction up and down. Further, it may be configured in such a way that the unit wiring 71 and the unit wiring 73 are arranged up and down, and the unit wiring 72 and the unit wiring 74 are arranged up and down, which may be vertically reversed. The branch wirings 38 connected to the unit wiring 71 are the group I, and the branch wirings 38 connected to the unit wiring 72 are the group II. The adjacent branch wirings 38 within the same group may be configured to belong to the different groups, such that the branch wirings 38 of the group I and the branch wirings 38 of the group II are alternately arranged. Similarly, the branch wirings 38 connected to the unit wiring 73 are the group III, and the branch wirings 38 connected to the unit wiring 74 are the group IV, as well as the branch wirings 38 of the group III and the group IV are alternately arranged within the pixel region 10.

When seen in each group unit, for example, the unit wirings 71 of the group I are disposed at an equal interval in the row direction. The branch wirings 38 of the group I are disposed at an equal interval in the row direction even within one unit wiring 71. Even when seen in the entire pixel region 10, the branch wirings 38 of the group I are disposed at a substantially equal interval for each four wirings and connected to the auxiliary capacitor bus lines 37 of the group I. In the other groups II to IV, the unit wirings 72 to 74 are disposed at a substantially equal interval in the row direction, and the branch wirings 38 are disposed at an equal interval in the row direction.

Figure 9:
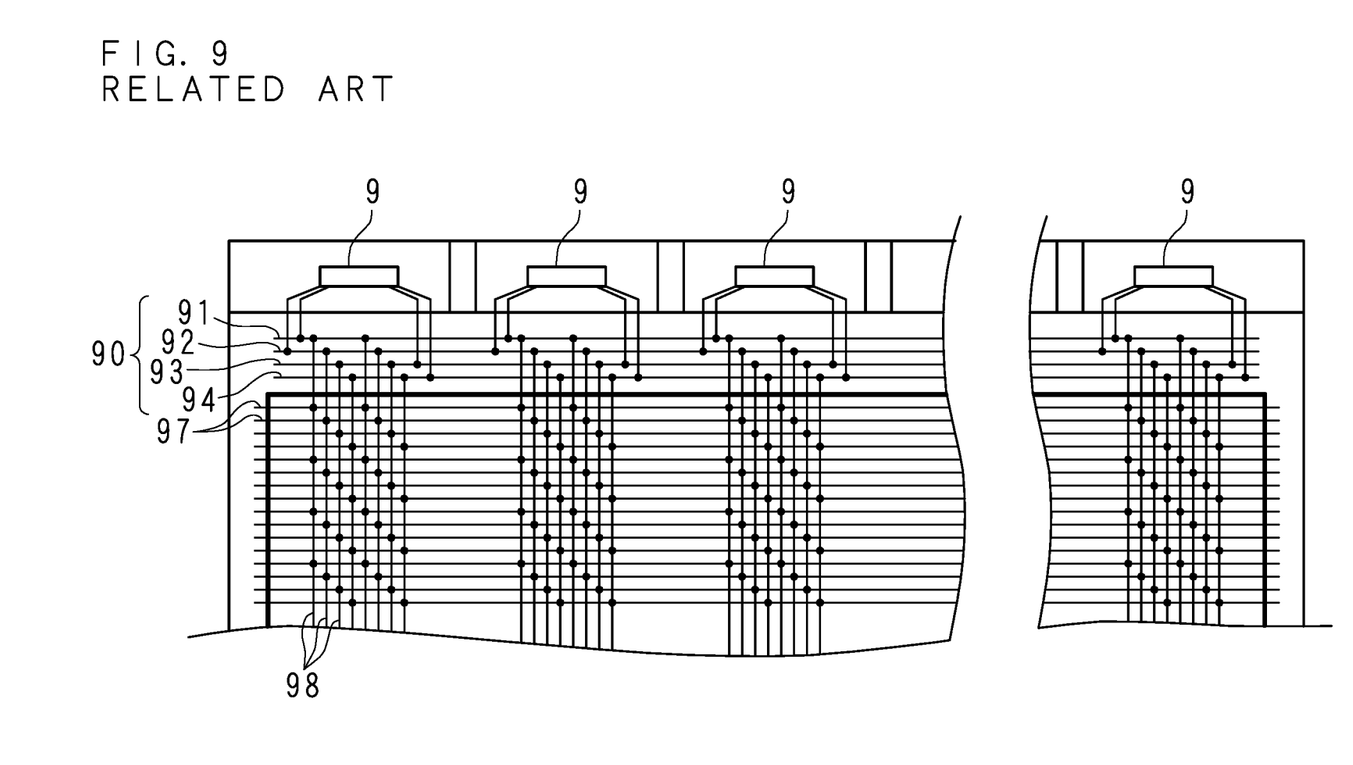
FIG. 9 is an explanatory view schematically illustrating an arrangement of a stem wiring in the related art.

FIG. 9 is an explanatory view schematically illustrating an arrangement of a stem wiring 90 in the related art. In the liquid crystal panel of the related art, auxiliary capacitor control units 9 output the control signal for each row to auxiliary capacitor bus lines 97 wired in the row direction through the stem wiring 90 and branch wirings 98. Also in the related art, the auxiliary capacitor control units 9 are divided into block units.

The stem wiring 90 in the related art includes four lines 91 to 94 wired over the substantially entire region of the liquid crystal panel in the longitudinal direction, at an upper peripheral part outside the pixel region 10. The branch wirings 98 are wired in the column direction over the inside and outside the pixel region 10. The branch wirings 98 are connected to any one of the lines 91 to 94 included in the stem wiring 90. The adjacent branch wirings 98 are configured to be connected to the different lines 91 to 94.

In the related art, specifically, the stem wiring 90 is classified into a line 91 of a group I, a line 92 of a group II, a line 93 of a group III, and a line 94 of a group IV. And, the branch wirings 98 are classified into each group of groups I, II, III, IV, I, II, III, IV, I, II and . . . in this order from the left. In addition, the branch wirings 98 and the stem wiring 90 are configured in such a way that the lines 91 to 94 thereof belonging to the same group are connected to each other. In this case, the stem wiring 90 occupies a wiring area by as much as four lines 91 to 94.

In this way, compared to the configuration in which the stem wiring 90 including the four lines 91 to 94 is wired in the row direction, as in Embodiment 1, by having the configuration in which the unit wirings 71 to 74 whose number of the groups are four, which are divided into two and are wired so as to be separated into two wirings, are used as the branch lines of the respective groups, it is possible to reduce the wiring area of the stem wirings in the column direction. Further, in this case, when comparing the related art with the present invention, the number of inputs from the branch wirings 38 and 98 to the auxiliary capacitor bus lines 37 and 97 within the pixel region 10 does not change. Therefore, a load of the stem wiring 70 when applying the present invention is substantially equivalent to the related art, such that it is possible to also suppress the wave rounding of the control signal to the respective auxiliary capacitors Cs as in the related art.

Furthermore, in the above description and drawings, for simplicity of description, the configuration including the stem wirings 70 in which the number of groups is set to four, which are separated into two in the column direction, and wired so as to be separated into two wirings, has been exemplified. However, the number of the groups is not limited to four. For example, in the existing products, the number of the groups is "twelve." In this case, the stem wirings 70 may be configured in such a way that twelve groups are divided into two, and are wired so as to be separated into six wirings, or the twelve groups are divided into three, and are wired so as to be separated into four wirings, and similarly, the twelve groups are divided into six, and are wired so as to be separated into two wirings. In the above description and drawings, for simplicity of description, the case in which four branch wirings 38 connected to one stem wiring having the unit wirings 71 to 74 is exemplified. However, in reality, the branch wirings 38 may be disposed to all the sub-pixels, or the branch wirings 38 may be disposed to the sub-pixels of a specific color.

Figure 6:
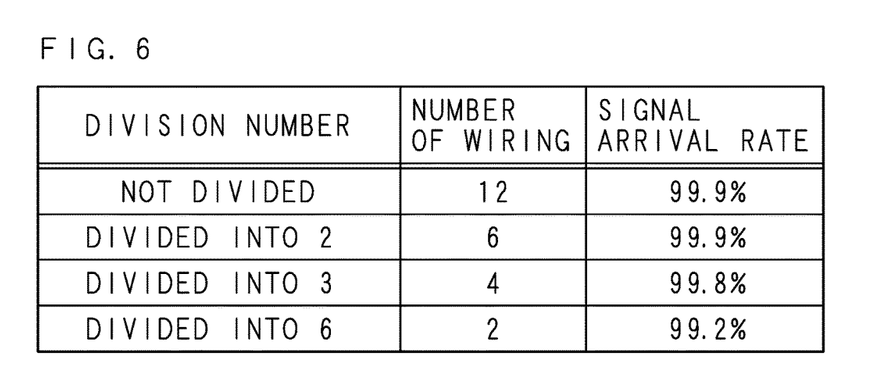
FIG. 6 is an explanatory view illustrating a transfer rate to each auxiliary capacitor according to Embodiment 1.

FIG. 6 is an explanatory view illustrating a transfer rate to the respective auxiliary capacitors Cs according to Embodiment 1. FIG. 6 illustrates results obtained, when the number of the groups is twelve, and the number of the wirings in the column direction of the stem wiring 70 is set to twelve, six, four and two, by simulating an arrival rate of the control signal to the respective auxiliary capacitors Cs as a table. Furthermore, the arrival rate of the control signal to the respective auxiliary capacitors Cs illustrates an arrival rate within a time after a 10/12 unit time of a duration in which a positive and negative rectangular wave are switched. It can be confirmed that, if securing the arrival rate of 99% or more, display quality is not affected.

As illustrated in FIG. 6, when using the stem wiring and the branch wirings in the configuration such as the related art without dividing the group, these wirings is connected to the auxiliary capacitor bus lines at a plurality of points, and thereby the arrival rate is 99.9%. In addition, also when using the stem wiring including the unit wirings wired so as to be separated into six wirings, the arrival rate is 99.9%. When using the stem wiring including the unit wirings in which twelve groups are divided into three and are wired so as to be separated into four wirings, the arrival rate is 99.8%. Further, when using the stem wiring including the unit wirings in which twelve groups are divided into six and are wired so as to be separated into two wirings, the arrival rate is 99.2%. As described above, when the number of wirings in the column direction of the stem wiring 70 is any one of twelve, six, four and two, the arrival rate is 99% or more, and the display quality is not affected. Therefore, even in the configuration including the stem wirings in which the twelve groups are divided into six and wired so as to be separated into two wirings, it is possible to suppress the wave rounding, achieve the display panel having sufficient display quality, and cope with the request of slimmed border.

Embodiment 2

Figure 7:
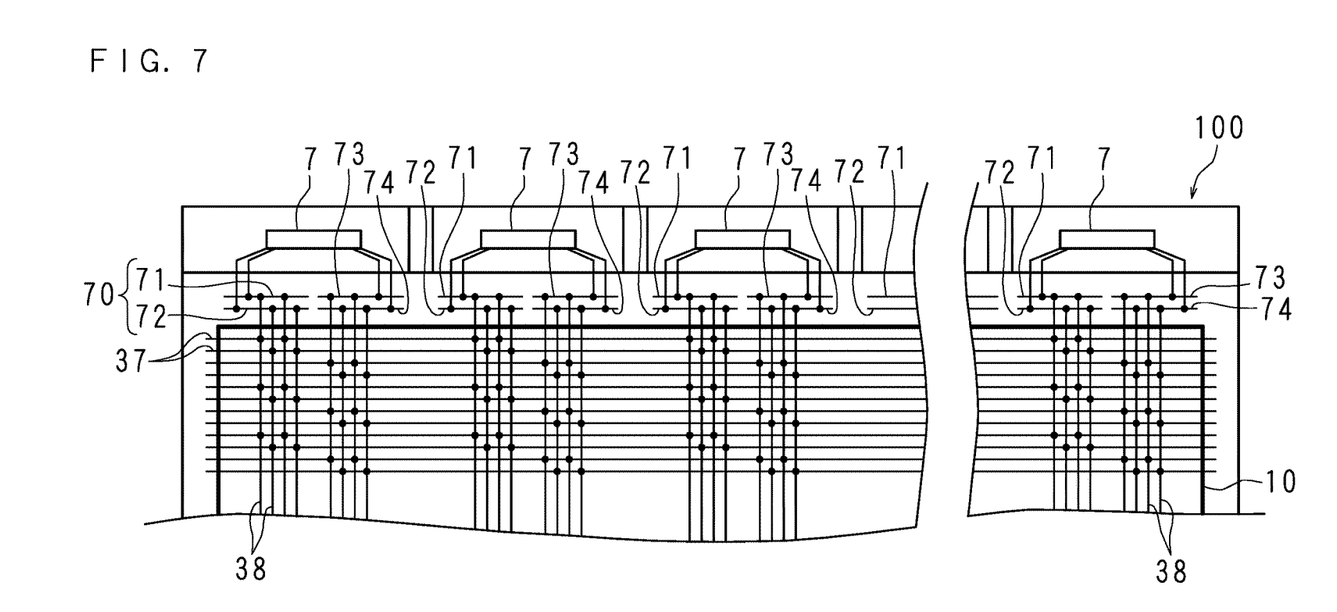
FIG. 7 is an explanatory view schematically illustrating an arrangement of a stem wiring according to Embodiment 2.

In Embodiment 1, the configuration, in which the separated auxiliary capacitor control units 7 are connected to the unit wirings 71 and 72 of the groups I and II, or the unit wirings 73 and 74 of the groups III and IV, respectively, has been described. Compared with this, in Embodiment 2, a configuration, in which the number of the unit wirings is two times, and the separated auxiliary capacitor control units 7 are connected to unit wirings 71 to 74 of four groups I to IV, respectively, will be described.

FIG. 7 is an explanatory view schematically illustrating an arrangement of a stem wiring 70 according to Embodiment 2. The stem wiring 70 is wired at the upper peripheral part outside the pixel region 10 along the row direction, so that two wirings thereof are separated into the same number. The separated wirings are referred to as the unit wirings 71 to 74, respectively. Further, the unit wirings 71 to 74 according to Embodiment 2 have a length half of that of the unit wirings according to Embodiment 1 in the row direction, while the number of the wirings is two times in the row direction.

The auxiliary capacitor control units 7 are connected to four unit wirings 71 to 74 which are arranged in two rows and two columns, respectively, and output, to the unit wirings 71 to 74 connected thereto, the control signal to the respective auxiliary capacitors Cs.

Also in Embodiment 2, the connection relationship between the stem wirings 70, the branch wirings 38 and the auxiliary capacitor bus lines 37 are configured in such a way that these wirings are classified into four groups, and the control signals for the groups are transferred from the auxiliary capacitor control unit 7.

A plurality of auxiliary capacitor bus lines 37 are classified so as to be the same group in every four rows. In each group unit, the auxiliary capacitor bus lines 37 of the same group are configured to be connected to a plurality of branch wirings 38 in the same group. The branch wirings 38 are configured to be connected to the respective unit wirings 71 to 74 at each two thereof, and the two branch wirings 38 belong to the same group.

Specifically, the auxiliary capacitor bus lines 37 are cyclically classified into four groups of groups I, II, III, IV, I, II and . . . from the top. The branch wirings 38 are cyclically classified into each group of groups I, II, I, II, III, IV, III, IV, I, II, I, II, III, IV, III, IV, I, II, I and . . . in this order from the left. The branch wirings 38 are configured to be wired in one block for each four groups (groups I to IV), and are configured in such a way that the adjacent branch wirings 38 within one block belong to different groups. And, the auxiliary capacitor bus lines 37 and the branch wirings 38, which belong to the same groups I to IV, are connected to each other.

The unit wirings 71 to 74 included in the stem wiring 70 are classified into the unit wiring 71 belonging to the group I, the unit wiring 72 belonging to the group II, the unit wiring 73 belonging to the group III, and the unit wiring 74 belonging to the group IV. The unit wiring 71 belonging to the group I and the unit wiring 72 belonging to the group II are arranged in the column direction up and down, the unit wiring 73 belonging to the group III and the unit wiring 74 belonging to the group IV are arranged in the column direction up and down, and the unit wirings 71 to 74 of the four groups are configured to be wired in one block. Further, it may be configured in such a way that the unit wiring 71 and the unit wiring 73 are arranged up and down, and the unit wiring 72 and the unit wiring 74 are arranged up and down, which may be vertically reversed. The branch wirings 38 connected to the unit wiring 71 are the group I, and the branch wirings 38 connected to the unit wiring 72 are the group II. The adjacent branch wirings 38 within the same group may be configured to belong to the different groups, such that the branch wirings 38 of the group I and the branch wirings 38 of the group II are alternately arranged. Similarly, the branch wirings 38 connected to the unit wiring 73 are the group III, and the branch wirings 38 connected to the unit wiring 74 are the group IV, as well as the branch wirings 38 of the group III and the group IV are alternately arranged within the pixel region 10.

Also in the configuration according to Embodiment 2, when seen in each group unit, for example, the unit wirings 71 of the group I are disposed at an equal interval in the row direction. The branch wirings 38 of the group I are disposed at an equal interval in the row direction even within one unit wiring 71. Even when seen in the entire pixel region 10, the branch wirings 38 of the group I are disposed at a substantially equal interval for each four wirings and connected to the auxiliary capacitor bus lines 37 of the group I. In the other groups II to IV, the unit wirings 72 to 74 are disposed at a substantially equal interval in the row direction, and the branch wirings 38 are also disposed at an equal interval in the row direction.

Also in the configuration according to Embodiment 2, compared to the configuration (FIG. 9) in which the stem wiring 90 including the four lines 91 to 94 is wired in the row direction, by having the configuration in which the unit wirings 71 to 74 wired so as to be separated into two wirings, are used as the branch lines of the respective groups, it is possible to reduce the wiring area of the stem wirings in the column direction. Further, in this case, when comparing the related art with the present invention, the number of inputs from the branch wirings 38 to the auxiliary capacitor bus lines 37 within the pixel region 10 does not change. Therefore, the load of the stem wiring 70 is substantially equivalent to the related art, such that it is possible to also suppress the wave rounding of the control signal to the respective auxiliary capacitors Cs as in the related art.

Embodiment 3

Figure 8:
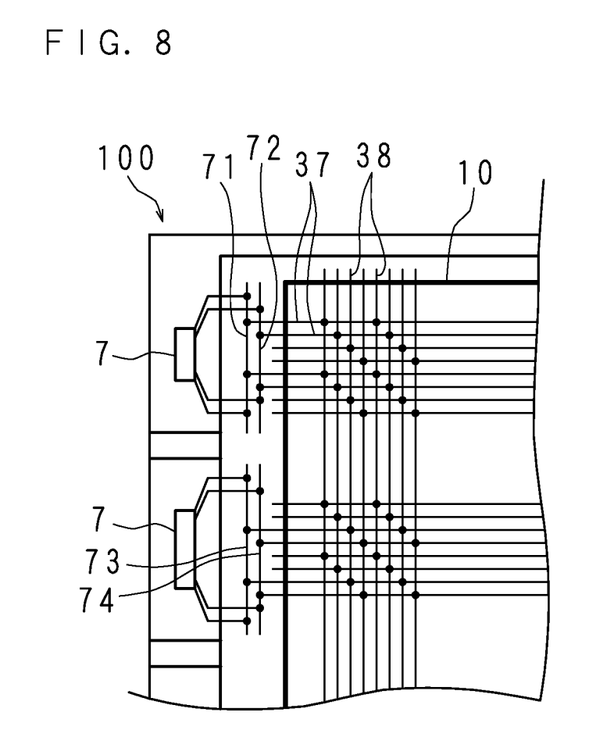
FIG. 8 is an explanatory view schematically illustrating an arrangement of a stem wiring according to Embodiment 3.

In Embodiments 1 and 2, the configuration in which the stem wiring 70 is disposed in the row direction, has been described. Compared with this, in Embodiment 3, a configuration, in which a stem wiring 70 is disposed in the column direction will be described.

FIG. 8 is an explanatory view schematically illustrating an arrangement of the stem wiring 70 according to Embodiment 3. The stem wiring 70 is wired at the peripheral part of both sides outside the pixel region 10 along the column direction, so that two wirings thereof are separated into the same number. The separated wirings are referred to as unit wirings 71 to 74, respectively. Further, FIG. 8 illustrates one side thereof in an enlarged form.

In response to outputting the control signal by the gate driver in block units obtained by dividing into a plurality of pixel regions 10 in the row direction, the auxiliary capacitor control unit 7 is similarly divided into block units. The auxiliary capacitor control units 7 of each block are connected with two unit wirings 71 and 72 (or 73 and 74) arranged right and left among the unit wirings 71 to 74, and outputs, to the unit wirings 71 and 72 (or 73 and 74) connected thereto, the control signal to the respective auxiliary capacitors Cs, respectively.

Also in Embodiment 3, the connection relationship between the stem wirings 70, the branch wirings 38 and the auxiliary capacitor bus lines 37 are configured in such a way that these wirings are classified into four groups, and the control signals for the groups are transferred from the auxiliary capacitor control unit 7.

A plurality of auxiliary capacitor bus lines 37 are classified so as to be the same group in every four rows. In each group unit, the auxiliary capacitor bus lines 37 of the same group are configured to be connected to a plurality of branch wirings 38 in the same group. The auxiliary capacitor bus lines 37 are connected to the respective unit wirings 71 to 74 for the groups.

Specifically, the auxiliary capacitor bus lines 37 are cyclically classified into four groups of groups I, II, III, IV, I and . . . from the top. The branch wirings 38 are cyclically classified into each group of groups I, II, III, IV, I and . . . from the left. For each group I to IV, the auxiliary capacitor bus lines 37 and the branch wirings 38, which belong to the same group, are connected to each other.

The unit wirings 71 to 74 included in the stem wiring 70 are configured in such a way that the unit wiring 71 belonging to the group I and the unit wiring 72 belonging to the group II are wired in one block side by side in the row direction right and left. Similarly, the unit wiring 73 belonging to the group III and the unit wiring 74 belonging to the group IV are configured to be wired in another block side by side in the row direction right and left. Further, it may be configured in such a way that the unit wiring 71 and the unit wiring 73 are arranged right and left, and the unit wiring 72 and the unit wiring 74 are arranged right and left, which may be horizontally reversed.

The auxiliary capacitor bus lines 37 in the same block as the unit wiring 71 of the group I are connected to the unit wiring 71. The auxiliary capacitor bus lines 37 of the group I are connected with the branch wirings 38 of the same group I, and the branch wirings 38 of the group I are connected with the auxiliary capacitor bus lines 37 of the same group I in the entire block. Thereby, the control signal of the group I transmitted from the auxiliary capacitor control unit 7 is transferred from the unit wiring 71 to the branch wirings 38 of the group I through the auxiliary capacitor bus lines 37 of the group I, and further transferred to the auxiliary capacitor bus lines 37 of the group I of another group through the branch wirings 38.

When seen in each group unit, for example, the unit wirings 71 of the group I are disposed at an equal interval in the column direction. The branch wirings 38 of the group I are disposed at a substantially equal interval for each four wirings in the row direction in the pixel region 10 and connected to the respective auxiliary capacitor bus lines 37. Therefore, the control signal is substantially equally transferred to the auxiliary capacitor bus lines 37 of each block. Thereby, it is possible to reduce the wiring area of the stem wirings, and suppress the wave rounding of the control signal to the respective auxiliary capacitors Cs as in the related art.

As this description is embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A liquid crystal panel comprising:

a substrate on which pixels, electrodes, and auxiliary capacitors of the electrodes are arranged, in a matrix, at a pixel region in a non-peripheral part, a set of one of the electrodes and one of the auxiliary capacitors being formed, so as to associate to each of the pixels;

a plurality of auxiliary capacitor wirings connected to the auxiliary capacitors associated to the pixels in each row, and being classified into groups so as to belong to the same group in every plurality of rows;

a signal transmission unit transmitting a signal to the auxiliary capacitors through the plurality of auxiliary capacitor wirings;

a plurality of branch wirings arranged in a column direction, being respectively connected to the plurality of auxiliary capacitor wirings of the same group on points within the pixel region;

a stem wiring supplying a signal to the plurality of branch wirings, consisting of unit wirings arranged to be separated from each other, in a row direction on a peripheral part of the substrate, and the unit wirings being respectively connected to a plurality of branch wirings belonging to the same group; and a transmission unit dividing the signal from the signal transmission unit for the groups and transmitting divided signals to the unit wirings respectively.

2. The liquid crystal panel according to claim 1, wherein the unit wirings are juxtaposed in the column direction, and the number of unit wirings in the column direction is smaller than the number of the groups.

3. The liquid crystal panel according to claim 1, wherein the plurality of auxiliary capacitor wirings of each group are connected with a plurality of unit wirings at an equal interval in the row direction among the unit wirings, through a plurality of branch wirings which are respectively connected to the plurality of unit wirings.

4. The liquid crystal panel according to claim 1, wherein each of the pixels respectively includes a plurality of sub-pixels for different colors or different light intensities, and the respective set of one of the electrodes and one of the auxiliary capacitors associates to each of the plurality of sub-pixels.

* * * * *